(12) United States Patent
Chen et al.

(10) Patent No.: US 6,763,087 B2
(45) Date of Patent: Jul. 13, 2004

(54) MOBILE VDSL SIGNAL DETECTOR

(75) Inventors: Shou-Li Chen, Hsinchu (TW); Yang Chen, Hsinchu (TW)

(73) Assignee: D-Link Corporation, Hsinchu (TW)

(*) Notice: Subject to any disclaimer, the term of this patent is extended or adjusted under 35 U.S.C. 154(b) by 311 days.

(21) Appl. No.: 10/095,968

(22) Filed: Mar. 13, 2002

(65) Prior Publication Data

US 2003/0174812 A1 Sep. 18, 2003

(51) Int. Cl.⁷ .................................................. H04M 3/08
(52) U.S. Cl. .............. 379/1.04; 379/1.03; 379/14.01; 379/15.01; 379/21; 379/22.04
(58) Field of Search ............................. 379/1.03, 1.04, 379/9.02, 9.06, 14.01, 15.01, 15.05, 21, 22.03, 22.04, 25, 26.01, 26.02, 24, 27.01, 30; 370/248, 251

(56) References Cited

U.S. PATENT DOCUMENTS

| | | | | |
|---|---|---|---|---|
| 5,835,580 A | * | 11/1998 | Fraser ................... | 379/115.01 |
| 6,163,594 A | * | 12/2000 | Kennedy et al. .............. | 379/21 |
| 6,292,468 B1 | * | 9/2001 | Sanderson ................... | 370/241 |
| 6,292,539 B1 | * | 9/2001 | Eichen et al. .............. | 379/1.04 |
| 6,380,971 B1 | * | 4/2002 | Brodigan ..................... | 348/180 |

* cited by examiner

Primary Examiner—Curtis Kuntz
Assistant Examiner—Barry W Taylor
(74) Attorney, Agent, or Firm—Bacon & Thomas PLLC

(57) ABSTRACT

The present invention relates to a detector comprising a microprocessor so that when a test item is inputted through an input device, the microprocessor is activated to read the test item and writes an identification (ID) of a user device or telecommunication device of CO corresponding to the test item into a VDSL chipset of the detector, which is used to simulate a virtual user device or telecommunication device of CO and enables the microprocessor to send a packet to telecommunication device of CO or user device for test, and quickly find out whether there is a line interruption or poor quality communication between telecommunication device of CO and user device.

7 Claims, 4 Drawing Sheets

MOBILE VDSL SIGNAL DETECTOR

FIELD OF THE INVENTION

The present invention relates to device for detect very high data rate digital subscriber line (VDSL) signal and more particularly to a mobile VDSL signal detector with improved characteristics.

BACKGROUND OF THE INVENTION

In recent years, the Internet has been widely employed worldwide. Particularly, the World Wide Web (WWW) can provide voice, graphics, and multimedia services in addition to e-mail transmission and receiving. As such, people can retrieve information from millions of sources. A conventional modem can only provide a transmission speed of 28.8, 33.6, or 56 kbps over a typical telephone line. Moreover, local area network (LAN) or even integrated service digital network (ISDN) cannot provide a transmission speed up to that of the Internet. Hence, more and more people are not satisfied with the above LAN and ISDN techniques. For accommodating the coming of multimedia which requires very large data, many Internet service providers (ISPs) propose solutions about high speed data transmission for users. Currently, digital subscriber line (DSL) is the most important one of the solutions. Intuitively, DSL is a digital telephone line rather than conventional plain old telephone service (POTS) which is analog in nature. DSL has many versions which are commonly called xDSL. In the DSL based systems, VDSL is the most important one. VDSL can transmit data over exiting POTS without additional equipment. Hence, VDSL can effect a faster data transmission, high transmission efficiency, and a great convenience to our daily life and work.

Also, VDSL is the fastest one among xDSLs. VDSL can provide a data transmission rate at a range between 12.9 Mbps and 52.8 Mbps or even up to 60 Mbps over a twisted pair wire. Note that transmission rate of VDSL varies depending on length of telephone line. VDSL can be symmetric or asymmetric. Transmission medium employed by VDSL based system is established on a copper wire based telephone line. Hence, a known telephone line (i.e., dial tone based one) can transmit a high data rate without altering the existing telephone line. In other words, VDSL is capable of not only providing a high speed data transmission but also maintaining the functions of known telephone line without being equipped with a telecommunication device of central office (CO). This configuration is best illustrated in FIG. 1. In the VDSL based system 1, a VDSL modem 30 is coupled to telecommunication device 10 of CO and a VDSL modem 40 is coupled to a user device 20 respectively. VDSL modems 30, 40 employ a bandwidth larger than that of voice so as to transmit data in high speed.

Moreover, telecommunication device 10 of CO is coupled to user device 20 via the known telephone line 50. A conventional analog telephone set is replaced by VDSL modem 40 coupled to user device 20. Hence, VDSL modem 40 has the function of the know telephone. A lower bandwidth portion of VDSL is utilized in the conventional telephone service. Such lower bandwidth portion is utilized by a POTS splitter 41 of VDSL modem 40 in a passive filtering so as to separate POTS signals from the lower bandwidth portion. The remaining bandwidth is utilized to transmit data.

VDSL modem 30 in CO has to modulate or encode data transmitted from ISP and Internet access signal transmitted from a telephone company or data transmitted from a network company into a VDSL signal. Further, VDSL signal is combined with POTS signal prior to transmitting to user device 20 over the known telephone line 50. Also, POTS splitter 41 of VDSL modem 40 in user device 20 can separate digital signal from POTS signal. The digital signal is in turn decoded or demodulated in ATU-R device 42. Finally, decoded or demodulated signal is transmitted to a device (e.g., computer) of user device 20. In a reverse transmission path, data from device of user device 20 is transmitted to VDSL modem 40 of user device 20 in which digital signal to be transmitted is encoded or modulated in ATU-C device 32. Then the encoded or modulated signal is combined with POTS signal having lower bandwidth prior to transmitting to CO. At CO, POTS splitter 31 of VDSL modem 30 can separate POTS signal from digital signal. Hence, digital signal to be transmitted is decoded or demodulated prior to transmitting to ISPs, Internet users, or Intranet.

In nature, VDSL is an all weather digital line without interfering voice channel. In other words, user can access VDSL data and make a call over known telephone line at the same time. That is why it becomes more and more popular among consumers. For accommodating such trend, many telecommunication service providers install additional communication devices for providing VDSL bandwidth services. This not only greatly increases data communication efficiency but also brings a great market to the art.

In above VDSL configuration, in the case that line interruption between telecommunication device of CO 10 and user device 20 or poor communication quality occurred, typically a service person has to carry a bulky computer and associated VDSL modem to the site of each node of the line for simulating telecommunication device of CO 10 or user device 20. In the simulation a packet is sent to telecommunication device of CO 10 or user device 20 for test. Then a determination is made as to whether a reply packet is sent back from user device 20 or telecommunication device of CO 10. This determination can assure that whether there is a line interruption between telecommunication device of CO 10 and user device 20 or the communication quality is poor. Such test technique is completely different from that performed on the conventional analog telephone line. Hence, service personnel are required to have a through network knowledge as well as the strength to carry a bulky computer and associated VDSL modem to the site of each node of the line for test. As such, an appropriate power source is required to install in each node of the line for supplying power for normal operation. In view of above, the test is very complicated and difficult. Moreover, very few service personnel of the telephone company can take this job since they are only familiar with repair of the conventional analog telephone line. Thus, a need exists in VDSL based wide bandwidth network system for providing a good communication quality while expanding the existing telephone line in the art.

SUMMARY OF THE INVENTION

It is desirable to provide a mobile VDSL signal detector. In use, a service person of a telephone company can bring the detector to a location along a telephone line coupled between a telecommunication device of CO and user devices for test so as to quickly find out the cause of a malfunction.

In one aspect of the present invention, the detector comprises a microprocessor so that when a test item is inputted through an input device, the microprocessor is activated to read the test item. Then an identification (ID) of a user device or telecommunication device of CO corresponding to the test item is written into a VDSL chipset of the detector. In VDSL chipset, a virtual user device or telecommunication device of CO is simulated. Next, send a packet to telecommunication device of CO or user device for test. Finally, a determination is made as to whether there is a line interruption between telecommunication device of CO and user device or the communication quality is poor based on a strength of a signal sent back from the telecommunication device of the CO or the user device. By doing this, it is possible of quickly finding out a malfunction occurred on the telephone line between telecommunication device of CO and user devices.

In another aspect of the present invention, the detector comprises a backup source for supplying power for normal operation of the detector. In use, a test person can carry the detector for checking the telephone line without having to carry an additional adaptor connectable to an external power source.

In a further aspect of the present invention, the detector comprises a set of indicators for showing test result for test person's visual reference. Hence, test person can quickly find out a malfunction occurred on the telephone line between telecommunication device of CO and user devices. Most importantly, the malfunction can be quickly solved, thus increasing communication efficiency and quality.

The above and other objects, features and advantages of the present invention will become apparent from the following detailed description taken with the accompanying drawings.

DETAILED DESCRIPTION OF THE PREFERRED EMBODIMENTS

The invention is directed to a mobile VDSL signal detector which is coupled to a telephone line between a telecommunication device of CO and user devices. The detector comprises a microprocessor so that when a test item is inputted through an input device, the microprocessor is activated to read the test item. Then an identification (ID) of a user device or telecommunication device of CO corresponding to the test item is written into a VDSL chipset of the detector. In VDSL chipset, a virtual user device or telecommunication device of CO is simulated. Next, send a packet to telecommunication device of CO or user device for test. Finally, a determination is made as to whether there is a line interruption between telecommunication device of CO and user device or the communication quality is poor based on a strength of a signal sent back from the telecommunication device of the CO or the user device.

Figure 1:
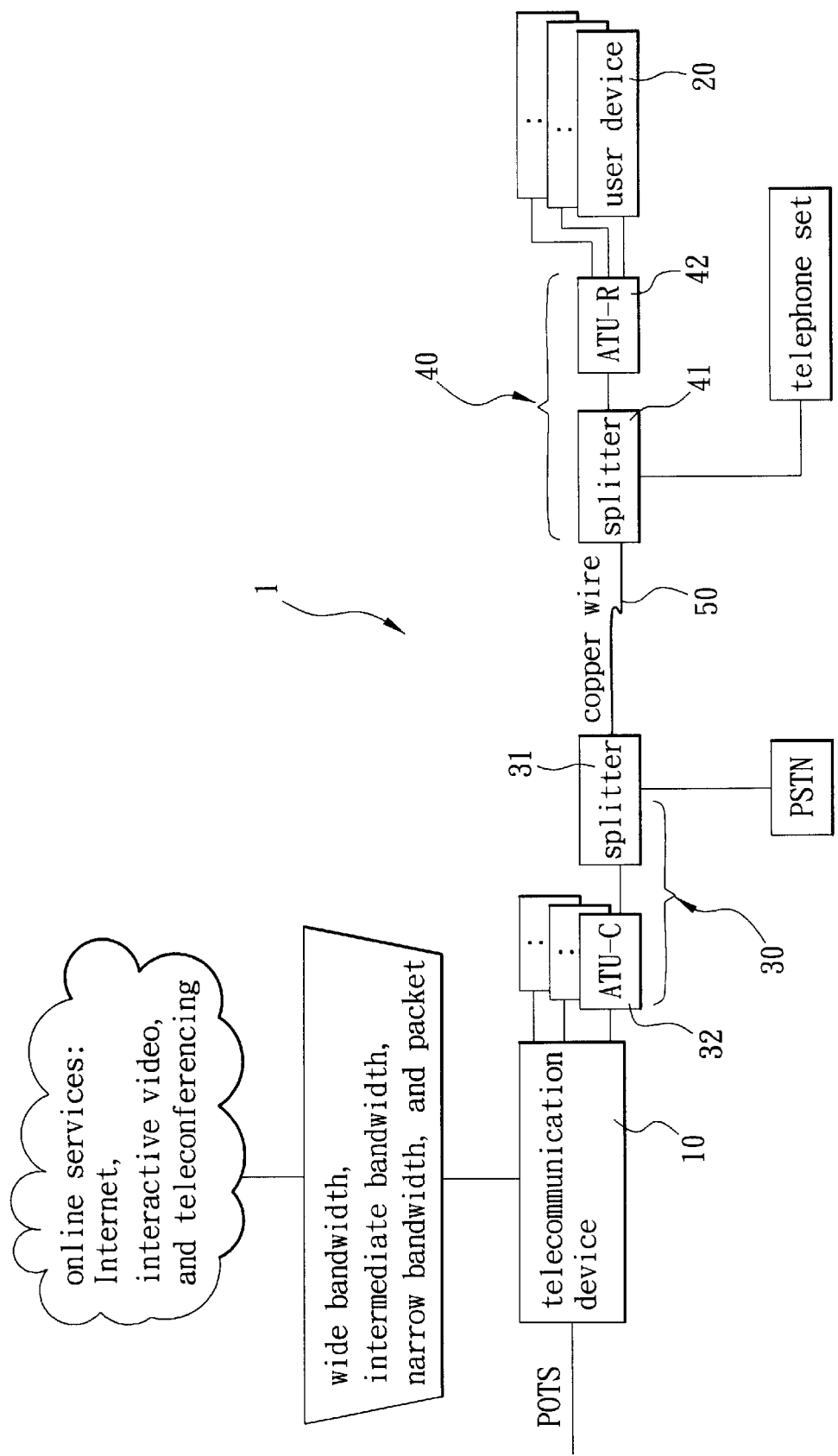
FIG. 1 presents schematically the connection of a conventional VDSL wide bandwidth system.
Figure 2:
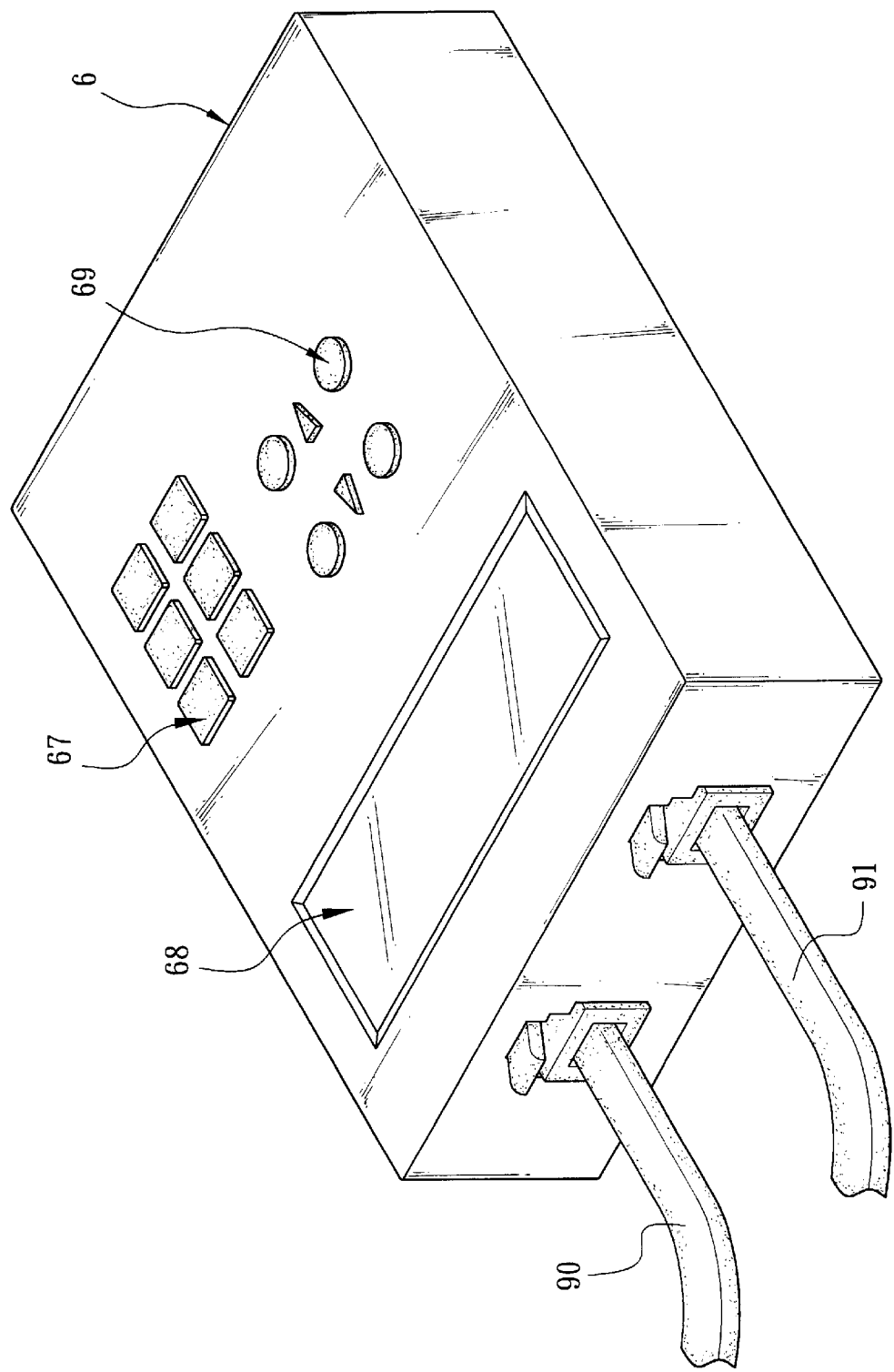
FIG. 2 is a perspective view of a mobile VDSL signal detector according to the invention.
Figure 3:
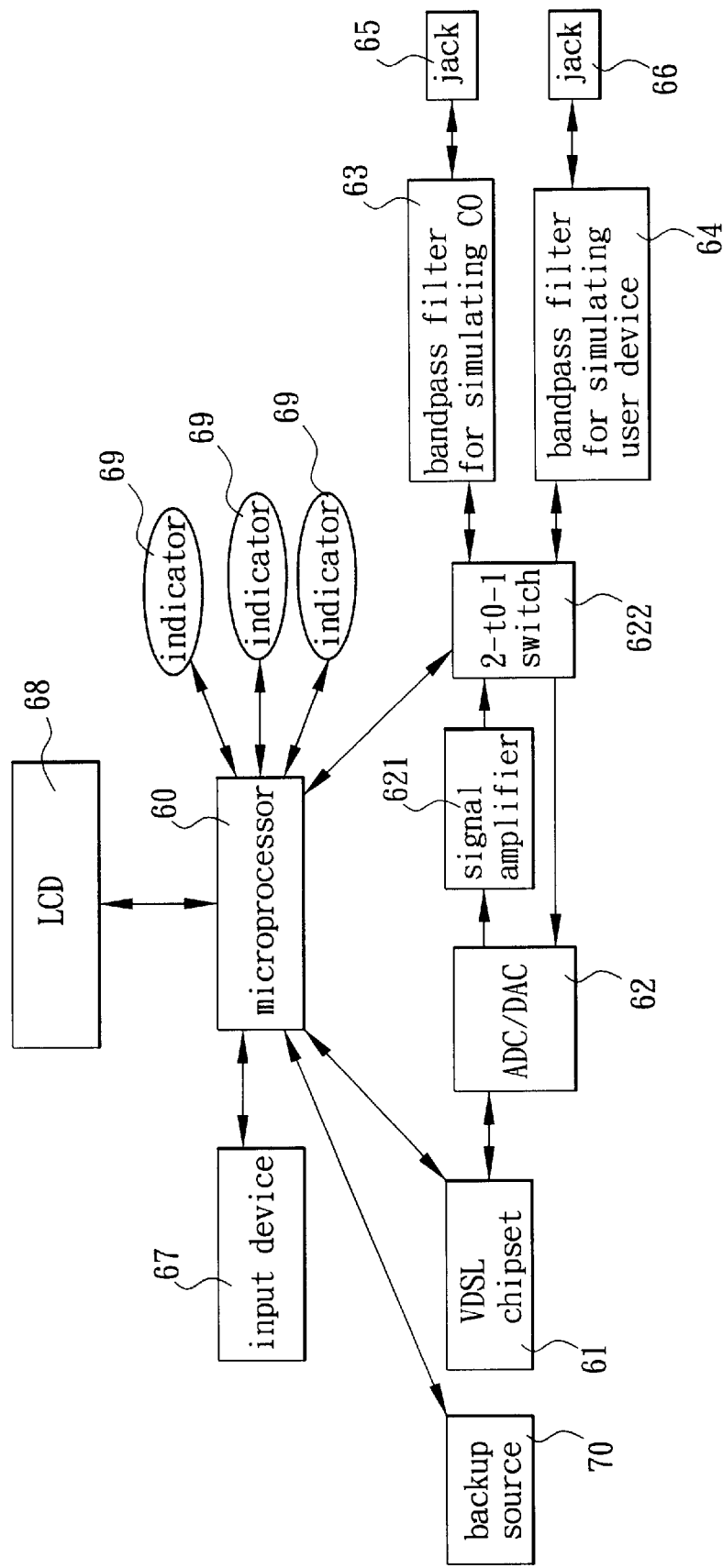
FIG. 3 is a block diagram showing components of the detector.

Referring to FIGS. 2 and 3, there is shown a mobile VDSL signal detector constructed in accordance with the invention comprising a case 6 for enclosing all circuits and components (e.g., a microprocessor 60, a VDSL chipset 61, an analog-to-digital/digital-to-analog converter (ADC/DAC) 62, two filters 63, 64, and two RJ-11 jacks 65, 66) of the detector. Microprocessor 60 acts to control normal operations of all circuits of the detector. VDSL chipset 61 is coupled to microprocessor 60 and comprises all circuits required for Internet connection. ADC/DAC 62 is coupled to VDSL chipset 61 for converting received analog signal into digital one or vice versa. A signal amplifier 621 is interconnected between ADC/DAC 62 and 2-to-1 switch 622. The 2-to-1 switch 622 is coupled to filters 63, 64 respectively. With this configuration, microprocessor 60 can switch an online connection between 2-to-1 switch 622 and filter 63 to that between 2-to-1 switch 622 and filter 64 in operation. In the embodiment, filters 63, 64 are bandpass filters for simulating telecommunication device of CO and user device respectively. Filter 63 acts to filter signal received from or transmitted to telecommunication device of CO. Filter 64 acts to filter signal received from or transmitted to user device. The other ends of filters 63, 64 are coupled to jacks (e.g., RJ-11 jack in the embodiment) 65, 66 respectively. Further, jacks 65, 66 are coupled to telecommunication device of CO and user devices through cables 90, 91 respectively.

Referring to FIGS. 2 and 3 again, the detector further comprises a liquid crystal display (LCD) 68, an input device (e.g., keypad) 67, a set of indicators (e.g., light-emitting diodes (LEDs) having different colors) 69, and a backup source (e.g., battery) 70. Each of above components is coupled to microprocessor 60. Input device 67 permits user to input data and select a test item. LCD 68 and indicators 69 act to show input data and test result respectively. Backup source 70 is responsible for supplying power for normal operation of all components.

In the case that there is a malfunction in the VDSL network system, a test person can bring the mobile VDSL signal detector to a site of each node of the telephone line. Then unplug the plugs on the node coupled to telecommunication device of CO and user devices prior to connecting the plugs to jacks 65, 66 on the detector. Hence, the detector is electrically coupled to telecommunication device of CO and user devices through cables 90, 91 respectively. Next, input an test item through input device 67 based on the test item shown on LCD 68. Then microprocessor 60 is activated to read the test item. Then an ID of a user device or telecommunication device of CO corresponding to the test item is written into a VDSL chipset 61. In VDSL chipset 61, a virtual user device or telecommunication device of CO is simulated. Then send a packet to telecommunication device of CO or user device for test. Finally, a determination is made as to whether there is a line interruption between telecommunication device of CO and user devices or the communication quality is poor based on a strength of a signal sent back from the telecommunication device of the CO or the user device. By doing this on every node of the telephone line, it is possible of quickly finding out the cause of the malfunction.

Figure 4:
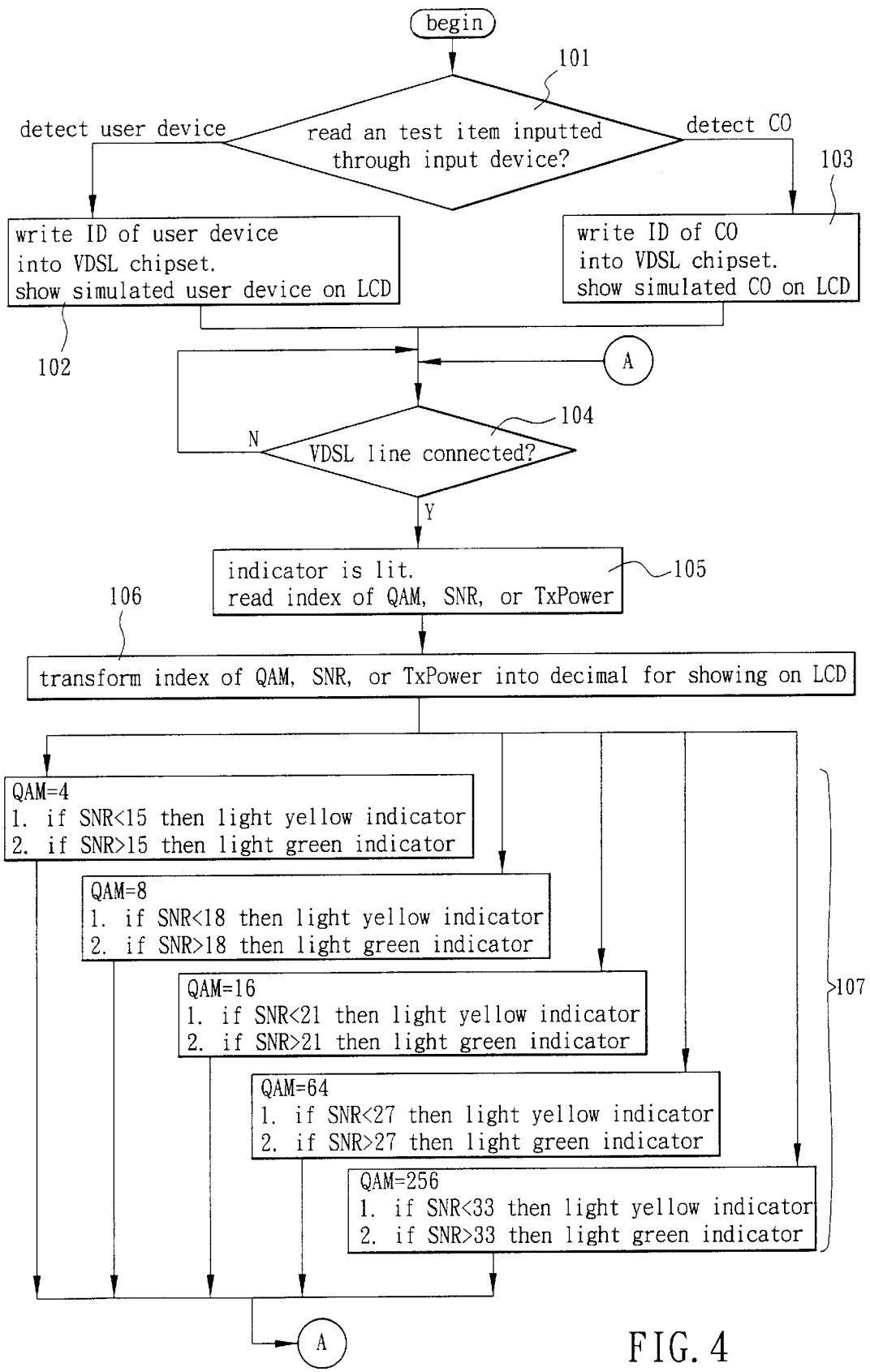
FIG. 4 is a flow chart illustrating a process performed by the detector according to the invention.

Referring to FIG. 4, there is shown a flow chart illustrating a process performed by the microprocessor 60 for testing a connection between telecommunication device of CO and each user device according to the invention.

In step 101, a determination is made whether a test item inputted through input device 67 is directed to either a test performed on a telephone line between one node and user device (i.e., jumped to step 102 immediately) or that performed on the telephone line between one node and telecommunication device of CO (i.e., jumped to step 103 immediately).

In step 102, access a memory (not shown) of microprocessor 60 for reading an ID of a telecommunication device of CO stored therein corresponding to the test item. The read out ID is then written into a VDSL chipset 61. In VDSL chipset 61, a virtual telecommunication device of CO is simulated. Then the telecommunication device of CO is coupled to user device. The simulated subject (e.g., telecommunication device of CO) is shown on LCD 68 for test person's visual reference. The process then jumps to step 104.

In step 103, access a memory (not shown) of microprocessor 60 for reading an ID of user device stored therein corresponding to the test item. The read out ID is then written into VDSL chipset 61. In VDSL chipset 61, a virtual user device is simulated. Then the user device is coupled to a telecommunication device of CO. The simulated subject (e.g., user device) is shown on LCD 68 for test person's visual reference. The process then also goes to step 104.

In step 104, send packet to telecommunication device of CO (or user device) prior to determining whether a reply packet is sent back from telecommunication device of CO (or user device). If yes, the process goes to step 105. Otherwise (i.e., the telephone line is disconnected), the process loops back to step 104 for continuation until the telephone line is connected again.

In step 105, one indicator 69 is lit to visually inform test person of the online status of VDSL line. Then read an index of the received packet (e.g., index of QAM, SNR, or TxPower signal). The process goes to step 106.

In step 106, index of the read packet is transformed into decimal one which is in turn shown on LCD 68 for test person's visual reference. The process then goes to step 107.

In step 107, an operation is made based on the decimal index of the read packet in order to determine strength of the received signal. Then select one of the indicators 69 having a unique color based on a result of the operation. Thus, test person can visually determine a status of the telephone line.

Test person can use the detector to perform an online test on a telephone line between telecommunication device of CO and user devices. Microprocessor of the detector can simulate telecommunication device of CO or user device based on the test item selected by test person. Hence, it is possible of performing a duplex signal detection on the VDSL line. Further, the detected online status (e.g., online of VDSL line, duplex QAM value, TxPower value of the tested terminal, or duplex SNR value) is shown on LCD 68 for test person's visual reference. Moreover, the microprocessor acts to light one of the indicators 69 based on the detected QAM value and the following operation rules stored in memory (see FIG. 4 again):

(a) In the case that QAM value is equal to 4, yellow indicator is lit if SNR value is less than 15 indicating weak signal. Otherwise, green indicator is lit if SNR value is larger than 15 indicating normal signal.

(b) In the case that QAM value is equal to 8, yellow indicator is lit if SNR value is less than 18 indicating weak signal. Otherwise, green indicator is lit if SNR value is larger than 18 indicating normal signal.

(c) In the case that QAM value is equal to 16, yellow indicator is lit if SNR value is less than 21 indicating weak signal. Otherwise, green indicator is lit if SNR value is larger than 21 indicating normal signal.

(d) In the case that QAM value is equal to 64, yellow indicator is lit if SNR value is less than 27 indicating weak signal. Otherwise, green indicator is lit if SNR value is larger than 27 indicating normal signal.

(e) In the case that QAM value is equal to 256, yellow indicator is lit if SNR value is less than 33 indicating weak signal. Otherwise, green indicator is lit if SNR value is larger than 33 indicating normal signal.

In brief, test person can understand a signal status on the VDSL line by visually observing the different colors shown on the set of indicators 69. Further, test person can carry the detector since backup source 70 can supply power for normal operation of the detector. Thus, an additional adaptor connectable to an external power source as experienced in prior art is not required. By doing above steps of the process on every node of the telephone line, it is possible of quickly finding out a malfunction occurred on the telephone line between telecommunication device of CO and user devices. Most importantly, the malfunction can be quickly solved, thus increasing communication efficiency and quality.

While the invention has been described by means of specific embodiments, numerous modifications and variations could be made thereto by those skilled in the art without departing from the scope and spirit of the invention set forth in the claims.

What is claimed is:

1. A mobile very high data rate digital subscriber line (VDSL) signal detector connectable to a telephone line coupled between a telecommunication device of a central office (CO) and user devices, the detector comprising:

a case for enclosing all circuits and components;

a microprocessor for controlling normal operations of all circuits;

an input device coupled to the microprocessor for data input and test item selection; and a VDSL chipset coupled to the microprocessor and comprising circuit elements required for Internet connection;

wherein when a test item is inputted through the input device, the microprocessor is activated to read the test item, in response an identification (ID) of the user device or the telecommunication device of the CO corresponding to the test item is written into the VDSL chipset for simulating a virtual one of the user device or the telecommunication device of the CO therein, to send a packet to the telecommunication device of the CO or the user device for test, and to determine whether there is a line interruption between the telecommunication device of the CO and the user device or a communication quality is poor based on a strength of a sent back signal from the telecommunication device of the CO or the user device.

2. The detector of claim 1, further comprising:

an analog-to-digital/digital-to-analog converter (ADC/DAC) coupled to the VDSL chipset and the microprocessor for converting a received analog signal into a digital signal or vice versa;

two filters having one ends coupled to the ADC/DAC for filtering the received or transmitted signal; and two jacks having one ends coupled to the other ends of the filters and the other ends coupled to the telecommunication device of the CO and the user devices through cables.

3. The detector of claim 2, further comprising:

a signal amplifier connected to the ADC/DAC for amplifying the received signal; and a 2-to-1 switch coupled to the filters, the signal amplifier, the microprocessor, and the ADC/DAC respectively so that the microprocessor is capable of switching an online connection between the 2-to-1 switch and one of the filters.

4. The detector of claim 2, wherein each of the filters is a bandpass filter for simulating the telecommunication device of the CO and the user device respectively so that one of the filters acts to filter a signal received from or transmitted to the telecommunication device of the CO and the other filter acts to filter a signal received from or transmitted to the user device, and the other ends of the filters are coupled to the jacks so that the jacks are coupled to the telecommunication device of the CO and the user devices through the cables.

5. The detector of claim 1, further comprising a liquid crystal display (LCD) coupled to the microprocessor for showing input data and a test result.

6. The detector of claim 1, further comprising a set of indicators coupled to the microprocessor for showing a test result.

7. The detector of claim 1, further comprising a backup source coupled to all circuits and components so as to supply power for a normal operation of the detector.

* * * * *